(12) United States Patent
Buscall et al.

(10) Patent No.: US 8,932,496 B2
(45) Date of Patent: Jan. 13, 2015

(54) AQUEOUS DISPERSIONS OF SILVER PARTICLES

(75) Inventors: Richard Buscall, Exeter (GB); Derek Graham, Guisborough (GB); Rory Anderson, West Brunswick (AU); Peter Joseph Scales, Research (AU); Paul Mulvaney, Alphington (AU); Robert James Eldridge, Glen Waverley (AU)

(73) Assignee: Akzo Nobel Coatings International B.V., Arnhem (NL)

( * ) Notice: Subject to any disclaimer, the term of this patent is extended or adjusted under 35 U.S.C. 154(b) by 496 days.

(21) Appl. No.: 13/133,605

(22) PCT Filed: Dec. 14, 2009

(86) PCT No.: PCT/EP2009/067015
§ 371 (c)(1),
(2), (4) Date: Aug. 23, 2011

(87) PCT Pub. No.: WO2010/069895
PCT Pub. Date: Jun. 24, 2010

(65) Prior Publication Data
US 2011/0300352 A1  Dec. 8, 2011

(30) Foreign Application Priority Data
Dec. 16, 2008 (EP) ..................................... 08171755

(51) Int. Cl.
| C09D 11/02 | (2014.01) |
| H01B 1/12 | (2006.01) |
| B22F 1/00 | (2006.01) |
| B22F 9/24 | (2006.01) |
| B82Y 30/00 | (2011.01) |
| C09D 11/52 | (2014.01) |

(52) U.S. Cl.
CPC ............. B22F 1/0022 (2013.01); B22F 1/0062 (2013.01); B22F 9/24 (2013.01); B82Y 30/00 (2013.01); C09D 11/52 (2013.01)

USPC .............. 252/520.3; 252/519.3; 252/519.33; 423/23; 423/24

(58) Field of Classification Search
USPC ..................................... 252/520.3; 423/23, 24
See application file for complete search history.

(56) References Cited

U.S. PATENT DOCUMENTS

| 2006/0264518 A1 | 11/2006 | Kato et al. |
| 2007/0003603 A1 | 1/2007 | Karandikar et al. |
| 2007/0207335 A1* | 9/2007 | Karandikar et al. .......... 428/560 |
| 2007/0234851 A1* | 10/2007 | Goia et al. ...................... 75/371 |
| 2008/0064767 A1 | 3/2008 | Chou et al. |

FOREIGN PATENT DOCUMENTS

| EP | 1 646 095 | 4/2006 |
| WO | 2007/120756 | 10/2007 |

OTHER PUBLICATIONS

International Search Report and Written Opinion for International Application No. PCT/EP2009/067015, dated Feb. 18, 2010, 12 pages.

* cited by examiner

Primary Examiner — Harold Pyon
Assistant Examiner — Katie L Hammer
(74) Attorney, Agent, or Firm — Kenyon & Kenyon LLP

(57) ABSTRACT

A method of preparing an aqueous dispersion comprising silver particles of mean diameter from 0.5 to 25 nm by weight and an aqueous carrier liquid, including the steps of i) providing a mixture comprising at least one silver salt, aqueous carrier liquid and a stabiliser for the particles ii) contacting the mixture with a non-ionic or covalent reducing agent to form a reaction mixture iii) causing the at least one silver salt to react with the reducing agent to form a dispersion comprising silver particles and acid wherein step iii) is partly or completely performed in the presence of anion exchange resin whereby the acid is exchanged for a hydroxide ion from the resin and/or is sorbed by the resin.

19 Claims, No Drawings

AQUEOUS DISPERSIONS OF SILVER PARTICLES

REFERENCE TO RELATED APPLICATION(s)

This application is the U.S. National Phase of PCT/EP2009/067015 filed on Dec. 14, 2009, and claims the benefit of EP Application No. 08171755.5, filed on Dec. 16, 2008.

This application relates to a method of making aqueous dispersions of silver particles, especially having mean diameters less than 25 nm, the dispersions themselves, compositions comprising the dispersions, in particular inks, and printed circuits derived from the inks.

Aqueous dispersions of small silver particles are attracting increasing interest due to their potential industrial applications, such as antimicrobial activity, catalysis, optical waveguides, radio frequency identification antennae, photovoltaic grids for generating electricity from solar energy, electrodes for thin film transistors and printed electrical circuits in general.

Printed electrical circuits are usually etched onto circuit boards. The boards themselves comprise a layer of conducting metal, usually copper foil, on a stiff supporting substrate. Electrically conducting circuits are produced by selectively etching away some of the conducting metal with acid to leave the electrical copper circuit. The circuit board is then populated with suitable electrical components to produce an electrical device or electrical component part.

Not only is the circuit board rigid, bulky and expensive, but the etching process is dirty and dangerous. Thus there is a need to provide electrically conducting circuits that are compact, flexible and cheap and can be manufactured by a safe and inexpensive process.

One way of doing this is to print the circuit directly onto a substrate, which can be a flexible substrate such as a polymer film, using electrically conducting ink comprising silver particles. However, in order to produce an efficient electrically conducting pathway the individual metal particles of the ink must form a sufficiently continuous metal film.

Of course, the melting point of silver is 962° C., significantly higher than the glass transition temperature (Tg) of polymers. Indeed, at such high temperatures most polymers that can be used as substrates will degrade or decompose.

However, the temperature at which small particles of silver sinter together can be much lower than the melting temperature of the bulk metal. For example, whilst bulk silver melts at 962° C., particles of silver of mean diameter about 50 nm sinter together at about 200° C. and those of 5 to 25 nm diameter sinter at about 120° C. At these lower temperatures many cheap and readily available plastic films survive.

Known processes for producing metal particles use high levels of organic solvents and/or produce particles in very low concentration. International patent publication WO 2007/120756 describes one such process using two incompatible solvents which phase separate on mixing. The process disclosed produces metal or metal oxide particles, of 5 to 10 nm diameter stabilised using a low molecular weight stabiliser. Approximately 300 to 800 g of organic solvents are required for each gram of metal or metal oxide particles produced. The removal of such large amounts of organic solvent is inconvenient, expensive and environmentally unfriendly. European patent application EP 1646095 also uses incompatible solvents to form precipitated metal particles of diameter from 10 to 100 nm stabilised with thermally removable, low molecular weight stabilisers. This process requires even more organic solvent, about 2400 g, for each gram of metal particles produced.

However, whilst EP 1646095 claims that the process it discloses works in the presence of water, there is no enabling disclosure of a process for producing silver particles in aqueous media. Furthermore, we have now discovered a significant further problem not recognised therein, namely that the reduction of the silver salt to form silver particles is very slow in water.

US patent application 2006/0264518 describes a process for producing agglomerates of fine silver particles at low solids and in the absence of a polymeric stabiliser. The solids of the dispersion are increased by centrifugation and then redispersing the resulting agglomerates to form a dispersion of fine silver particles—a lengthy and complex process.

US patent application 2008/0064767 discloses a complicated process for making aqueous dispersions of silver particles of from 6 to 11 nm and solids content up to 1.5 wt %.

Thus, a simple and more environmentally acceptable process for producing silver particles either in aqueous dispersion at high concentration or as dried powders is very desirable.

We have now devised a method for preparing silver particles in aqueous carrier liquid that is simple, uses little or no organic liquid, proceeds at an acceptable, sustainable rate and provides stable dispersions at higher solids content than previously. Furthermore, the dispersions produced are substantially free of inorganic acid.

According to the present invention there is provided a method of preparing an aqueous dispersion comprising silver particles of mean diameter from 0.5 to 25 nm by weight and an aqueous carrier liquid, including the steps of
  i) providing a mixture comprising at least one silver salt, aqueous carrier liquid and a stabiliser for the particles
  ii) contacting the mixture with a non-ionic or covalent reducing agent to form a reaction mixture
  iii) causing the at least one silver salt to react with the reducing agent and form metal particles and acid
wherein step iii) is partly or completely performed in the presence of anion exchange resin whereby the acid is exchanged for a hydroxide ion from the resin and/or is sorbed by the resin.

Preferably the solids content of the dispersion is up to 20 wt %, more preferably from 1.6 to 20 wt %, yet more preferably from 1.6 to 15 wt %, still more preferably from 1.6 wt % to 12 wt % and most preferably from 1.6 to 12 wt %.

Preferably, step iii) is completely performed in the presence of the ion exchange resin.

The use of the anion exchange resin is an efficient and convenient way to remove the acid from the reaction mixture formed by the reduction of the silver salt.

Surprisingly, we find that the removal of the acid allows the reaction to proceed at an enhanced rate-conversion of the silver salt to metallic silver particles is almost 100%. In addition because the resin is in the form of millimeter sized beads, it is easily separated from the reaction mixture, particularly from the much smaller silver particles, once the reaction is complete, by simple filtration or alternatively by passing the reaction mixture through a fixed bed of resin.

Furthermore, carrying out the reaction in the presence of the ion exchange resin, produces particles which are smaller than otherwise they would be. The dispersion is also storage stable. In certain circumstances, especially at high silver solids content, when ion exchange resin is not used in accordance with the invention, a silver mirror is produced on the interior of the reaction vessel rather than a stable dispersion of silver particles.

The use of the ion exchange resin has the further advantage that the aqueous dispersion is free of the acid generated from the reduction of the silver salt and/or the salt produced by neutralization of said acid with base. Thus, further washing and/or purification is largely unnecessary. This is advantageous when using the dispersion as a basis for formulating certain products, for example antimicrobial preparations and catalysts.

When separated, the anion exchange resin can be regenerated by treatment with a suitable base and re-used.

Anion exchange resins usually comprise high molecular weight ionic polymers, typically in the form of porous beads. The ionic groups incorporated into the polymer are positively charged and form part of the polymer network. Associated with these groups are negatively charged counter-ions, for example hydroxide ions. The hydroxide ions are mobile and can be exchanged for other similarly charged ions present in a surrounding medium. Thus, in the present invention, the dissociated anions generated by acid formed by the reduction of the silver salt, and other adventitious acidic moieties, can be exchanged for hydroxide ions. It is important that the counter-ions are hydroxide ions as, when exchanged with the anion of the salt, the hydroxide ions form water in the reaction mixture. Water, of course does not need to be removed from the dispersion and keeps the process simple.

Suitable ionic groups attached to the polymer are strong or weak bases.

Strong bases are those that are largely dissociated, in much the same way that sodium hydroxide is. For example, one family of such strong bases is tri-alkyl ammonium hydroxide:

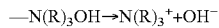
—N(R)$_3$OH→N(R)$_3^+$+OH$^-$ and where the equilibrium is towards the right, favouring dissociation.

Resins containing such groups are known as strong base anion exchange resins.

Other suitable examples of strong bases include quarternary ammonium groups such as trialkyl ammonium chloride, di-alkyl 2-hydroxyethyl ammonium chloride, di-alkyl 2-hydroxyethyl ammonium hydroxide.

Resins containing such groups include USF-A-464 MEG (OH), available from Siemens and Ambersep™ 900 OH, available from Rohm & Haas Weak bases are those that are only partially dissociated

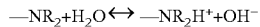
—NR$_2$+H$_2$O ↔ —NR$_2$H$^+$+OH$^-$ and where the equilibrium is toward the left.

Resins containing such groups are known as weak base anion exchange resins.

Suitable examples of weak bases include amino groups and ammonium hydroxide.

Resins containing such groups include the Dowex™ range such as Dowex™ 65, 66, 550; Purolite™; Remco™; the Siemens range including USF-A-444 (FB) and the Rohm & Haas range including Amberlite™ IRA67RF.

Some anion exchange resins may contain small amounts of low molecular weight, possibly, water soluble material. Whilst this may not interfere in any material way with the particle formation, it is nevertheless advisable to optionally, wash the resin prior to use. Water or aqueous alkaline solutions are preferred.

In practice, the weak base anion exchange resins may, by virtue of the poor dissociation of the anionic group, simply sorb the dissolved anion loosely within the pores of the anion exchange resin rather than undergo true anion exchange. In any case, the acid generated from the reduction of the silver salt is effectively removed from the reaction mixture. This has the effect of raising the pH.

Preferably the pH of the reacting mixture is maintained at pH from 3 to 10 more preferably from 3 to 9, even more preferably from 4 to 9, yet more preferably from 4 to 8, still more preferably from 4 to 7 and most preferably from 5 to 7. Not only is the reaction rate higher in these ranges but the silver particles formed tend to be smaller and the dispersions containing them more stable.

The pH of the final silver dispersion following removal of the anion exchange resin is preferably from 3 to 10, more preferably from 3 to 9, even more preferably from 4 to 9, yet more preferably from 4 to 8, still more preferably from 4 to 7 and most preferably from 5 to 7.

The term anion exchange as used in this specification is intended to cover both true anion exchange and also this form of sorption; that is absorption and/or adsorption.

Preferably, the amount of anion exchange resin used in the invention contains a sufficient quantity of negatively charged counter-ions, preferably hydroxide ions, so as to exchange with all of the acid generated in the reaction mixture. This amount of anion exchange resin is defined herein as the acid equivalent amount. More preferably, the amount of anion exchange resin used is from 1 to 2 times the acid equivalent amount, still more preferably from 1 to 1.5 that amount and most preferably from 1 to 1.2 times that amount.

Once ion-exchange is complete, the porous polymer beads may be isolated from the reaction mixture and regenerated, that is returned to their original form, usually by treatment with base. This enables them to be re-used reducing still further the environmental impact of the process.

Weak base anion exchange resins are preferred because they are easily and quickly regenerated, in accordance with the manufacturer's instructions.

The ion exchange resin may be present in the aqueous mixture during the reaction or added after reaction is complete.

Preferably, the ion exchange resin is present throughout the reaction as this ensures that the reaction proceeds at a reasonable rate. In any event, it is more convenient to charge the resin with the other ingredients.

Alternatively, the reacting mixture may be passed over a fixed bed of resin either occasionally or continuously during the reaction.

The first time the resin is used in the reaction may result in a reduced yield of silver. Surprisingly, however, following regeneration of the resin and re-use in subsequent reactions, the yield of silver is substantially in accordance with the stoichiometry of the reaction, as shown for example, in Equations 1 and 2 below.

Of course, the acid formed in step iii) of the process could be neutralised by addition of base to keep the pH within the preferred range. However, this would require continuous addition of base throughout the reaction to avoid large fluctuation in pH. In addition, the salt formed on neutralising the acid would preferably need to be removed as a later step adding complexity and cost to the process.

The at least one silver salt is, preferably at least, partially soluble in the aqueous carrier liquid, more preferably it is soluble at concentrations of from 0.01 moles l$^{-1}$ to 4 moles l$^{-1}$, even more preferably from 0.1 to 3 moles l$^{-1}$, yet more preferably from 0.25 to 3 moles l$^{-1}$, still more preferably from 0.25 to 2 moles l$^{-1}$. Most preferably the silver salt is completely soluble in the aqueous phase at the concentration used in the mixture as this tends to produce smaller particles.

Suitable examples of silver salts for use in the invention include silver acetate, silver trifluoroacetate, silver lactate, silver benzoate, silver nitrate, silver carbonate, silver perchlorate, silver phosphate and mixtures thereof. Most preferred is silver nitrate as it is readily available and soluble in water.

The at least one metal salt may consist of a single salt or a mixture of salts.

Suitable examples of reducing agents include hydrazine and its derivatives, including carbohydrazide; dialkyl hydroxylamines such as diethyl hydroxylamine, dialkyl ketoximes such as methylethyl ketoxime and sodium borohydride. Preferably, the reducing agent is non-ionic or covalent. Ionic reducing agents, such as sodium borohydride, produce ionic by-products which must be removed when the metal dispersions are used in some applications. Such removal can be difficult and adds complexity and cost to the process. Using non-ionic or covalent reducing agents avoids this complexity.

It is preferable to use a reducing agent that itself produces only gaseous by-products other than water during the reaction as this obviates the need for an additional scrubbing step to remove by-products.

Hydrazine itself is such a reducing agent producing only nitrogen as the by-product. For example, the reduction of silver nitrate produces nitrogen as shown in Equation 1 below viz

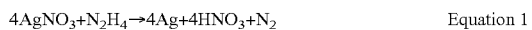
$$4AgNO_3 + N_2H_4 \rightarrow 4Ag + 4HNO_3 + N_2 \qquad \text{Equation 1}$$

Unfortunately, hydrazine is toxic and thus must be handled with care. Furthermore, it forms highly explosive mixtures with certain materials including nitric acid.

Nitric acid is formed when a metal nitrate, for example silver nitrate, is reduced, as shown in Equation 1. The use of the anion exchange resin significantly reduces the risk of explosion because it effectively removes the acid from the mixture.

Most preferred of the hydrazine derived reducing agents is carbohydrazide, a non-toxic solid material that is cheap and readily available in commercial quantities. Carbohydrazide reacts with water to generate hydrazine and carbon dioxide viz

$$NH_2NH\ CO\ NH\ NH_2 + H_2O \rightarrow 2N_2H_4 + CO_2 \qquad \text{Equation 2}$$

Consequently, when carbohydrazide is used as the reducing agent the only by-products produced in making the silver particles, other than the acid, are carbon dioxide and nitrogen.

Whilst the dialkyl hydroxylamines and the dialkyl ketoxime are effective reducing agents they are less preferred than the carbohydrazide. This is because they produce volatile liquids (carboxylic acids and ketones respectively) rather than gaseous by-products. Nevertheless, although not as convenient, such volatile organic compounds are easily removed. Thus, this group of reducing agents is also useful in this invention.

By aqueous is meant that at least 50% by weight of the carrier liquid is water, the remainder being an organic liquid. Preferably the carrier liquid contains from 50 to 100% water, more preferably from 75 to 100%, even more preferably from 90 to 100% water and most preferably the carrier liquid is water.

Where an organic liquid is used it is preferably compatible with the water at the concentration used. By compatible is meant that there is no phase separation of the liquids. This provides a simple process as complicated mixing and stirring regimes are unnecessary and complex separation techniques are avoided.

The reaction may be carried out at any temperature above the freezing point of the aqueous carrier liquid, below the sintering temperature of the silver particles formed and below the cloud point of the stabiliser. Preferably, the reaction temperature is between 10 to 75° C., more preferably between 10 to 70° C., even more preferably between 10 to 60° C., yet more preferably between 20 to 50° C. and most preferably between 20 to 30° C.

In another aspect of the invention there is provided an aqueous dispersion of silver particles of mean diameter from 0.5 to 25 nm by weight made by the process hereinbefore described. Preferably the particles have a mean diameter of from 1-15 nm, more preferably from 1 to 10 nm and most preferably from 2.5 to 10 nm.

Narrow particle size distributions are preferred as there will always be fewer larger particles for a given mean particle size thereby reducing the effective sintering temperature.

The role of the stabiliser is twofold; firstly during particle formation it must have sufficient affinity to bind to the surface of the newly formed particle and prevent further crystal growth and/or accretion, thus allowing some control of the size of the particles; secondly, once the reaction is complete and the particles are formed, it prevents further particle aggregation and/or sedimentation.

Stabilisers for use in aqueous carrier liquids comprise a first portion having a greater affinity for the dispersed phase, in this case the silver surface, than the aqueous carrier liquid (such a portion is also referred to as an anchor group) and a second portion having a greater affinity for the aqueous carrier liquid than the metal surface. This results in the particle surface being at least partly covered by the stabiliser. In this way, either by charge repulsion or through steric interactions, the silver particles are prevented from coming into contact with each other and thereby flocculating.

The anchor groups are selected for their affinity to the surface of the silver particle. Groups that bind sufficiently to the silver surface include ionic groups such as phosphate ($-PO_4^{3-}$), carboxylate ($-CO_2^-$) and phosphonate. Most preferred are carboxylate groups.

Non-ionic groups can also bind sufficiently and suitable such groups include amine ($-NH_2$), thiol ($-SH$) and carboxyl ($-CO_2H$).

Carboxylate and phosphonate groups are preferred.

In the case of carboxylate groups, having the groups arranged as adjacent pairs, for example as provided by maleic anhydride, is also advantageous in providing stable dispersions of small particles.

The second stabiliser portion comprises hydrophilic polymers. Suitable such polymeric portions include polyethylene glycol, polyvinyl alcohol, acrylic polymers rich in acrylic acid and/or methacrylic acid. Polyethylene glycol containing polymers are preferred as these produce the best properties when formulated into, for example, an ink.

When the stabiliser comprises an acid rich acrylic polymer it is preferred to at least partially neutralise the dispersant. This increases the solubility of the second portion in the aqueous carrier liquid.

Suitable stabilisers include polymeric dispersants such as block copolymers, random copolymers or comb-graft copolymers. Most preferred are comb-graft copolymers.

Preferably, the amount of stabiliser is from 5 to 35%, more preferably from 15 to 25%, calculated on a weight basis on the silver.

Comb-graft copolymers are preferred as stabilisers because they produce the smallest particles and most stable dispersions.

Comb-graft copolymers are a type of branched polymer. They have a polymer backbone with pendant side-chains with the backbone and the side-chains being different in some way. This may be because the monomer composition of the backbone is different to the side-chain or that the relative amounts of the monomers are different. In the case of a stabilising material, the major difference in the backbone and side-chain is the choice of functional groups.

Preferred comb-graft copolymers for use as stabilisers in this invention are derived from monomers comprising maleic anhydride and polyethylene glycol methacrylate.

Particularly useful comb-graft copolymers for use as stabilisers are maleic anhydride-polyethylene glycol methacrylate polymers of the structure I, shown in its acid form below:

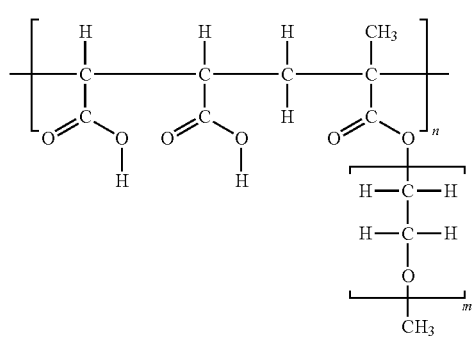

Preferably n is from 2 to 100, more preferably from 5 to 100, even more preferably from 10 to 80, still more preferably from 15 to 70 and yet more preferably from 20 to 60; m is preferably from 7 to 50, more preferably from 7 to 25 and yet more preferably from 7 to 20. Most preferred of all is the structure I where n is from 28 to 32 and m is 10 or 11.

Of course, the structure represented above is an idealised one. It is understood by the person skilled in the art that a statistical distribution of structures results from the polymerisation of such monomers.

One of the carboxyl groups in the backbone of the structure shown in I may be reacted with other molecules comprising groups reactive with carboxyls whilst still producing particles of mean particle size from 0.5 to 25 nm. Such reactive groups include amines and hydroxyls. Suitable amines include the following primary amines: β-alanine, cysteamine, diamino hexane, lysine, propylamine and ethanolamine.

Structure II illustrates the reaction product of a maleic anhydride PEG methacrylate comb graft copolymer reacted with β-alanine.

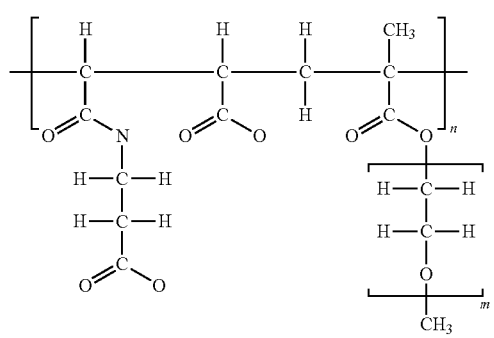

The reaction product of structure I with cysteamine is particularly effective at producing particles of mean particle size down to 1 to 3 nm, especially when m is from 10 to 12 and n is from 28 to 32.

Preferably, the acid value of the comb-graft polymer stabiliser is from 40 to 250 mg KOH/gram of nv stabiliser, more preferably from 90 to 230, even more preferably from 120 to 220, yet more preferably from 150 to 200, still more preferably from 160 to 190 and most preferably from 170 to 190 mg KOH/g of nv stabiliser.

Preferably, the stabilisers are not volatilised by exposure to temperatures at or around the sintering temperatures of the particles.

The viscosity of the dispersion increases as its non-volatile content increases and this can make separating the anion exchange resin from the dispersion at the end of the reaction difficult. It is preferable, therefore, to keep the non-volatile content during manufacture, especially on the production scale, to below 15 wt %, more preferably below 12 wt %.

The particles produced by the method of the invention are substantially spherical.

In some circumstances it is desirable to have the silver particles in the form of a dried powder. In such cases the particles may be isolated from the aqueous mixture by, for example, filtration, spray drying and/or freeze drying provided the temperature of the particles is not allowed to rise above the sintering temperature for the particles. Preferably, the silver particles can be redispersed by stirring into an aqueous carrier liquid.

Of course, on drying at temperatures above the sintering temperature of the particles, the forces are such that the particles come together and touch and/or adhere to form a conducting pathway.

In another aspect of the invention there is provided an inorganic acid-free aqueous dispersion of silver particles produced by the method including the steps of
  i) providing a mixture comprising at least one silver salt, aqueous carrier liquid and a stabiliser for the particles
  ii) contacting the mixture with a non-ionic or covalent reducing agent to form a reaction mixture
  iii) causing the at least one silver salt to react with the reducing agent to form a dispersion comprising silver particles and acid
  iv) separating the anion exchange resin from the dispersion of metal particles once the reaction is complete
wherein step iii) is partly or completely performed in the presence of anion exchange resin whereby the acid is exchanged for a hydroxide ion from the resin and/or is sorbed by the resin.

In another aspect of the invention there is provided an ink formulation comprising any one of the dispersions as hereinbefore described, the ink formulation being suitable to form conductive traces or circuits.

Preferably, the ink formulation also comprise ingredients selected from the group consisting of water soluble organic alcohols and surfactants.

Suitable examples of the alcohols include ethanol, isopropanol and the glycols.

The ink may be applied to a substrate using known techniques including ink jet, gravure coating, flexographic, offset lithographic, screen and stencil printing.

In yet another aspect of the invention there is provided a substrate, preferably a polymer substrate, with an electrically conducting pathway derived from an ink as hereinbefore described.

The compositions were characterised according to the following methods

Particle Size Analysis

The spinning disc centrifuge technique was used to measure the particle size distribution of the dispersions. The principle of the method is based on the size dependence of the rate of sedimentation of particles when a centrifugal force is applied (Stoke's law). In general smaller particles take longer. The rate at which particles arrive at the outside of the rotating disc is measured by a Light Emitting Diode and this information is then converted to a size distribution. This technique is well suited to silver particles due to their yellow colour (Plasmon band) and high density relative to the fluid in which they are suspended (water).

In order to make the measurement the concentrated silver sample is diluted so as to obtain a pale yellow dispersion. For a 5% w/w silver dispersion this would require a dilution factor of approximately 1:1000. The exact ratio is not important as the volume of silver is not a factor in the calculation. Dilution is necessary to be able to detect a difference in absorption; a concentrated silver dispersion would completely absorb the light from the LED.

A CPS disc centrifuge model DC24000 was used to make the measurements (supplied by Analytik Ltd. Unit 4, The Acorn Centre, Chestnut Avenue, Biggleswade, Bedfordshire, United Kingdom SG18 0RA or direct from CPS Instruments Inc, 7349 SE Seagate Lane, Stuart, Fla., 34997, USA). The sample was injected into the instrument and the disc spun at 24,000 rpm. It takes approximately 1 hour to sediment the smallest particles (2-3 nm). A size distribution is calculated from the sedimentation rate taking 10.5 g cm$^{-3}$ to be the density of silver. The real and imaginary parts of the complex refractive index for silver at the wavelength of the LED (405 nm) are also required and were obtained from the literature and are 0.173 and 1.95 respectively. From the distribution a mean particle diameter by weight is calculated.

EXAMPLES

Ingredients Used in the Examples

Maleic anhydride and Polyethylene glycol methacrylate 475 are available from Sigma Aldrich of The old Brickyard, New Road, Gillingham, Dorset, SP8 4XT.

Dowex 66™ is a weak base (t-amine) anion exchange resin and Dowex™ Marathon a strong base (quarternary amine) anion exchange resin are both available from Dow Corporation, 3050 Spruce Street, St. Louis, Mo., 63103 USA.

Vazo 67 is available from DuPont

Stabiliser Examples

Stabiliser 1

The stabiliser was prepared using the ingredients listed below in accordance with the following method.

To a 1 litre flask fitted with a stirrer, nitrogen purge, thermometer and reflux condenser was added MEK (4), maleic anhydride (2) and PEG methacrylate 475 (1) and the temperature raised to achieve reflux at about 85° C.

The mixture was purged with nitrogen gas throughout at a rate of 200 cm$^3$ per minute. After an initial purge of 10 minutes the benzoyl peroxide (3) was added and the mixture maintained under reflux for 1.5 hours for polymerisation to complete. The resultant stabiliser solution was cooled to 20-25° C. and added to diethyl ether (5) whilst stirring. On addition the stabiliser precipitated and was filtered and washed with more diethyl ether after which any remaining diethyl ether was removed by drying in an oven.

|  | g | mMoles |
|---|---|---|
| 1. PEG methacrylate 475 | 31.41 | 66.1 |
| 2. Maleic anhydride | 9.00 | 91.8 |

-continued

|  | g | mMoles |
|---|---|---|
| 3. Benzoyl peroxide | 7.65 | 22.1 |
| 4. MEK | 128.18 |  |
| 5. Diethyl ether | 700.00 |  |

The molecular weight (Mw), Acid Value (AV) and non-volatile content (nv) were measured.

An 18 wt % stabiliser solution was made by dissolving 2.2 g of the stabiliser in 10 g of water and adjusting the pH to 7 using sodium hydroxide solution.

Stabiliser 2

This is a cysteamine adduct of a PEG acrylate-maleic anhydride comb copolymer. The following ingredients were used Stage 1

|  | g | mMoles |
|---|---|---|
| 1. PEG acrylate 454 | 129.0 | 264.0 |
| 2. Maleic anhydride | 36.0 | 367.0 |
| 3. Vazo 68* | 24.6 | 88.0 |
| 4. Acetone | 60.0 |  |
| 5. Toluene | 247.0 |  |
| 6. N,N-dimethyl formamide | 25.0 |  |

*4,4'-azobis(4-cyanovaleric acid)

The same method and equipment was used as in Stabiliser 1.

The resulting solution of stage 1 copolymer was poured into 1.2 L of diethyl ether. The copolymer was allowed to settle, the cloudy ether layer poured off and the copolymer washed with three 40-50 mL lots of ether. After residual ether was removed by evaporation the yield of red waxy copolymer was 127 g.

One gram of copolymer was dissolved in 10 mL of aqueous 1 molar potassium chloride solution and titrated with 0.1 molar potassium hydroxide solution. The acid capacity was found to be 3.2 mol/kg=Acid Value of 179.5 mg KOH/g polymer.

Stage 2

|  | g |
|---|---|
| 1. Copolymer (from stage 1) | 15.00 |
| 2. Ethanol | 15.00 |
| 3. Cysteamine hydrochloride | 2.74 |
| 4. Triethylamine | 2.44 |
| 5. Ethanol | 15.00 |

A solution of cysteamine was made by dissolving cysteamine hydrochloride (3) in ethanol (5) and triethylamine (4). Dried copolymer (1) from Stage 1 was separately dissolved in ethanol (2) then quickly stirred into the cysteamine solution. After 2 hours the copolymer was precipitated in 200 mL of diethyl ether and washed twice with 20 mL portions of ether. The crude product was redissolved in ethanol and again precipitated and washed with ether. After evaporation of residual ether the infrared spectrum of the purified product showed absorption near 1565 cm$^{-1}$, attributable to the expected substituted amide link.

Silver Particle Dispersions

The reactions were all carried out at 20 to 30° C.

Dispersion Example 1

A dispersion of silver particles was made using the ingredients listed below and in accordance with the following method. The temperature of all the reactions was from 20 to 25° C.

To a 250 cm³ beaker was added 70 g of demineralised water (1) and 16.60 g (100 mmoles) of silver nitrate (2) and 12.2 g of an 18 wt % aqueous solution of Stabiliser 1 (3), whilst stirring. To this was added over the course of 2 hours 11.16 g (12.5 mmoles) of the carbohydrazide solution (4) whilst continuing to stir. When all of the reducing agent had been added 40 g (1.1 acid equivalent weight of nitric acid) of the ion exchange resin (5) was added and the stirring continued for a further 14 hours to complete the reaction, as confirmed by UV/Visible spectroscopy.

|   | g |
|---|---|
| 1. Demin Water | 70.00 |
| 2. Silver nitrate | 16.60 |
| 3. Stabiliser 1 solution (18 wt % in water) | 12.20 |
| 4. Carbohydrazide soln (10.4 wt % in water) | 11.16 |
| 5. Dowex 66 | 40.00 |

The ion exchange resin is separated from the dispersion of silver particles by filtering through a 100 mesh sieve which can be aided by applying reduced pressure. The resin is washed with 2×25 cm³ portions of distilled water to remove any silver particles attached.

The particle size of the silver dispersion was determined by Disc Centrifuge as 4 to 10 nm with 6 nm being typical. The dispersion is storage stable, showing no signs of agglomeration and sedimentation for at least 4 months at room temperature.

nv=10.57 wt %
pH=7
mean diameter=6 nm

Dispersion Example 2

Dispersion Example 1 was repeated except that the anion exchange resin, Dowex 66, was omitted from the recipe. The reaction was very slow and the silver precipitated to form, first a silver mirror on the inner surface of the reaction vessel which on standing formed a flocculated non-redispersible mass.

Dispersion Example 3

The procedure as outlined in Dispersion 1 was repeated however instead of Dowex 66 the resin IRA 69 (ex Rhom and Haas) was used. This is also a weak base resin and appears to be an effective sorb for nitric acid. A mean particle size of 11 nm was obtained from disc centrifuge.

Dispersion Example 4

In this example the procedure outlined for Dispersion Example 1 was repeated but the 16.6 g of silver nitrate was replaced with 16.7 g of silver acetate (ex Sigma Aldrich). Silver acetate is only soluble to the extent of about 1% by weight in water therefore unlike the silver nitrate example where the precursor was completely soluble, the silver precursor was for the most part dispersed in water. By the end of the reaction, all the silver acetate was consumed and a stable dispersion of silver nanoparticles obtained. The mean particle size as measured by disc centrifuge was 17.4 nm.

Dispersion Example 5

In this example, the silver nitrate was replaced by 13.8 g silver carbonate $Ag_2CO_3$ (ex Sigma Aldrich). This salt is even more insoluble in water than silver acetate. The procedure was repeated although it was noted that after the 16 hour period, some of the silver carbonate had not reacted. Nevertheless the bulk of the material had and stable silver nanoparticles were obtained. These have a mean particle size of 25 nm as measured by disc centrifuge and this was confirmed by TEM. Since the solubility is much lower and the locus of reaction almost certainly in the solution phase we postulate that a longer reaction time will lead to complete conversion.

The invention claimed is:

1. A method of preparing an aqueous dispersion comprising silver particles of mean diameter from 0.5 to 25 nm by weight and an aqueous carrier liquid, the method including the steps of
   i) providing a mixture comprising at least one silver salt, an aqueous carrier liquid and a stabiliser for the silver particles
   ii) contacting the mixture with a non-ionic or covalent reducing agent to form a reaction mixture
   iii) causing the at least one silver salt to react with the reducing agent and form the silver particles and an acid;
   wherein step iii) is partly or completely performed in the presence of an anion exchange resin wherein the acid is exchanged for a hydroxide ion from the resin and/or the acid is sorbed by the resin, wherein the anion exchange resin is in the form of porous polymer beads.

2. The method according to claim 1 wherein the amount of the anion exchange resin is at least the acid equivalent amount.

3. The method according to claim 1 wherein the aqueous carrier liquid comprises less than 50% by weight of a water compatible liquid.

4. The method according to claim 1 wherein the aqueous carrier liquid is water.

5. The method according to claim 1 wherein the at least one silver salt is at least partly soluble in the aqueous carrier liquid.

6. The method according to claim 4 wherein the at least one silver salt is completely soluble in the aqueous carrier liquid.

7. The method according to claim 1 wherein the at least one silver salt is silver nitrate.

8. The method according to claim 1 wherein the reducing agent is selected from the group consisting of hydrazine and carbohydrazide.

9. The method according to claim 8 wherein the reducing agent is carbohydrazide.

10. The method according to claim 1 wherein the anion exchange resin is a weak base resin.

11. The method according to claim 1 wherein the stabiliser is a comb graft copolymer.

12. The method according to claim 11 wherein the stabiliser comprises

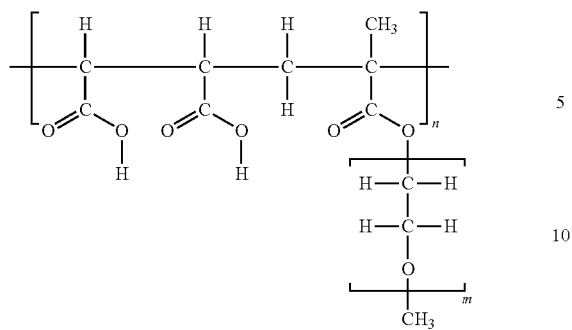

where m is from 7 to 50 and n is from 2 to 100.

13. The method according to claim 12 wherein m is 10 or 11 and n is from 28 to 32.

14. The method according to claim 1, further comprising separating the silver particles from the aqueous carrier liquid and drying the silver particles.

15. An aqueous dispersion obtained by the method of claim 1.

16. The aqueous dispersion according to claim 15 wherein the solids content is from 10 to 20 wt %.

17. A composition comprising the aqueous dispersion according to claim 16.

18. An ink composition comprising the aqueous dispersion according to claim 16.

19. A substrate printed with the ink composition according to claim 18.

* * * * *